Jan. 5, 1965 J. J. SKUBAL 3,164,668

TERMINAL PEDESTAL FOR BURIED WIRING SYSTEMS

Filed Aug. 27, 1959 2 Sheets-Sheet 1

INVENTOR.
JOHN J. SKUBAL
BY
Andrus + Starke
Attorneys

TERMINAL PEDESTAL FOR BURIED WIRING SYSTEMS

Filed Aug. 27, 1959 2 Sheets-Sheet 2

INVENTOR.
JOHN J. SKUBAL
BY
Andrus + Starke
Attorneys

United States Patent Office 3,164,668
Patented Jan. 5, 1965

3,164,668
TERMINAL PEDESTAL FOR BURIED WIRING SYSTEMS

John J. Skubal, West Allis, Wis., assignor to McGraw-Edison Company, Milwaukee, Wis., a corporation of Delaware Filed Aug. 27, 1959, Ser. No. 836,513
9 Claims. (Cl. 174—45)

This invention relates to a terminal connecting pedestal for buried wiring systems and particularly to a pedestal establishing an above-ground assembly for connecting and splicing buried conductors such as transmission wires and cables of a telephone system.

The external transmission wires and associated equipment of a telephone is mounted as either an aerial system or a buried system. In the aerial system, the transmission wires and associated components are mounted on the conventional telephone pole. In an underground system, at least the transmission wires are actually buried in the ground.

With the advent of improved methods of burying the transmission wires and with the development of improved insulation resulting in wires which have a relatively long life, increasing interest has been shown in the erection of buried telephone systems.

The buried system has many desirable features. Thus, storms, floods and similar natural catastrophes and phenomena do not affect or interrupt telephone service. In seacoast and adjacent areas, severe corrosion problems which are encountered in aerial system due to the salt water conditions are practically eliminated. Underground or buried systems generally have a lower maintenance cost and are somewhat safer than the conventional aerial type.

The transmission through a telephone system normally is through an exchange cable containing a great number of conductor pairs of voice transmission wires which extend from the central office to a distribution point near the customer's premises. At the distribution point preselected conductor pairs are connected by suitable connecting or drop wires to the customer's premises and thus to his telephone.

In the original installation of the exchange cable, the system designer must project into the future and establish a certain flexibility for connection of future customers and also for rearranging of the conductor pairs to establish the most advantageous use of the conductor pair in the system. Even with the best and wisest design work there are always unanticipated customers and locations which require revision of existing facilities. This creates a more or less continuous requirement of adding new terminals on already working cables and rearranging the old terminals to employ unused conductor pairs available at locations with unusually heavy traffic. Further, in all systems, cable junctions and operating components such as load coils which are installed in relatively long cables to improve voice transmission signals must be connected within the circuit.

The vast and intricate system of external wires and terminals in a buried system must include suitable connecting means above the ground for splicing, termination, distribution, loading of conductor pairs and the like.

The connecting means must also be such as to allow the initial connection of the conductor pair to the customer's telephone and for the installation of the operating components and subsequent rearranging and adding of terminals. Further, the connection unit must be readily available for maintenance and replacement of parts and other servicing.

Current practice uses a terminal pedestal mounted in ground with a terminal block secured to the external end.

Selected conductor pairs or the complete cable are pulled out of the ground and secured to the pedestal for initial connection to the terminal block and for ready servicing, maintenance and rearranging of the conductor pairs. Load coils and like associated equipment are also mounted upon the upper end of the pedestal.

Generally, prior art structures have included a wood or steel pole member mounted in the ground adjacent the terminal point. The terminal blocks or connecting means and associated components are mounted directly on the member and encased in a non-metallic tube to protect the terminal blocks and the like from the elements. The casing is a non-metallic member such as a cement asbestos composition, vitrified clay or concrete. Whenever the service is required, the complete outer casing is removed. The installation and servicing are both quite awkward and difficult.

Further, the outer casing is fragile and readily fractured. Consequently, the life of the unit is not commensurate with requirements of telephone systems.

An alternate construction provides a wood or steel fence post with a separate terminal box mounted on the upper ends of the supporting post. The cables and conductor wires are run up along side of the post and into the terminal box. This unit has a very substantial disadvantage of leaving the cables exposed between the ground and the terminal box. Consequently, they are not only subject to mechanical damage but are also subject to damage from brush fires and the like.

Further, in the encased construction, moisture and insects tend to accumulate within the terminal block area. Spiders present a particular problem because they weave webs between the adjacent binding post on the terminal bloc. The webs in any substantial quantity cause cross talk and other erratic operation of the telephone system. Moisture also tends to create the same general problems of cross talk and erratic operation.

The terminal pedestals are remotely located from a central office. Consequently, both the mechanical and electrical performance should exhibit a high degree of dependability for long periods. Further, due to the great number of terminal pedestals required in the system, the pedestals must be economically mounted and serviced.

The present invention establishes a terminal pedestal which is substantially and practically completely weather and insect proof. The pedestal is easily installed and maintained and is constructed to provide immediate and ready access to the terminal block, without pivoting the block, and other components required in the buried telephone system. The cables and conductors are securely mounted within the unit without establishing undue tension on the binding posts within the terminal block.

Generally, in accordance with the present invention, separable walls define a hollow post housing for completely encircling the rising telephone conductors. One of the walls is a relatively shallow channel member. The other is a relatively deep channel cover member which is adapted to be secured in telescoped relation to the shallow member to establish a weather and insect proof housing.

The shallow member extends downwardly into the ground and a ground cover is secured to the shallow member and extends upwardly into engagement with the lower end of the upper cover member. A grommet plate is secured between the ground cover and the upper cover member. The grommet plate includes openings which permit ready passage of the conductor wires and maintain a substantial seal to prevent entrance of insects such as spiders and excessive moisture from rising upwardly through the pedestal and into engagement or contamination of the terminal block and the like.

The terminal block and other elements are rigidly mounted to the base of the relatively shallow member in such a manner that with the deep cover removed, the components and terminal block are readily available for servicing and the like.

The cover is secured to the shallow wall portion in telescoped relation to establish a rigid and strong housing.

In accordance with another aspect of the invention, the terminal mounting strip is located generally centrally and slightly forwardly of the overlap portion of the housing and centrally between the overlapped wall portions. As a practical matter this construction eliminates the moisture from entering the housing and contacting the terminal block in the most severe driving rains and the like.

Depending upon the number of terminal blocks to be accommodated by the pedestal unit the upper end of the housing is closed directly by a cap or by a drum type housing. Where a relatively small number of terminal blocks accommodating a relatively few conductor pairs are required, the terminal block is mounted directly within the shallow stake portion of the pedestal. The small cap is then secured to the top cover to seal the top of the housing. The construction is generally referred to as a wire type pedestal installation.

However, where a relatively large number of conductor pairs must be accommodated and a corresponding large number of terminal blocks or the like are required, an enlarged drum type housing or dome is releasably secured to the upper end of the pedestal to accommodate the large cable to loop and the terminal block. The terminal block is secured to the upper end of the pedestal such that when the dome is removed, ready access of the several binding posts and other components is established without any further movement of the terminal block or other components. This construction is generally referred to as a cable type pedestal installation.

The pedestal of the present invention is particularly adapted for residential areas because it can be constructed from suitable sheet metal and has good esthetic characteristics and consequently may be mounted in residential areas without detracting from the surrounding landscape. Thus, the present invention provides an economic and superior type terminal pedestal which provides maximum strength and rigidity for enclosing the conductor pairs and the terminal connections, the load coil and other operating components and the like against moisture and insects. The device is readily installed and maintained. Access is simple and unobstructed. Further, the pedestal is not readily subject to mechanical damage due to contact with cutting mechanisms and the like or from brush fires which are established in rural areas in lieu of actual cutting of the surrounding areas.

The drawings furnished herewith illustrate the best mode presently contemplated for carrying out the present invention.

Figures 1, 2, 3, 4:
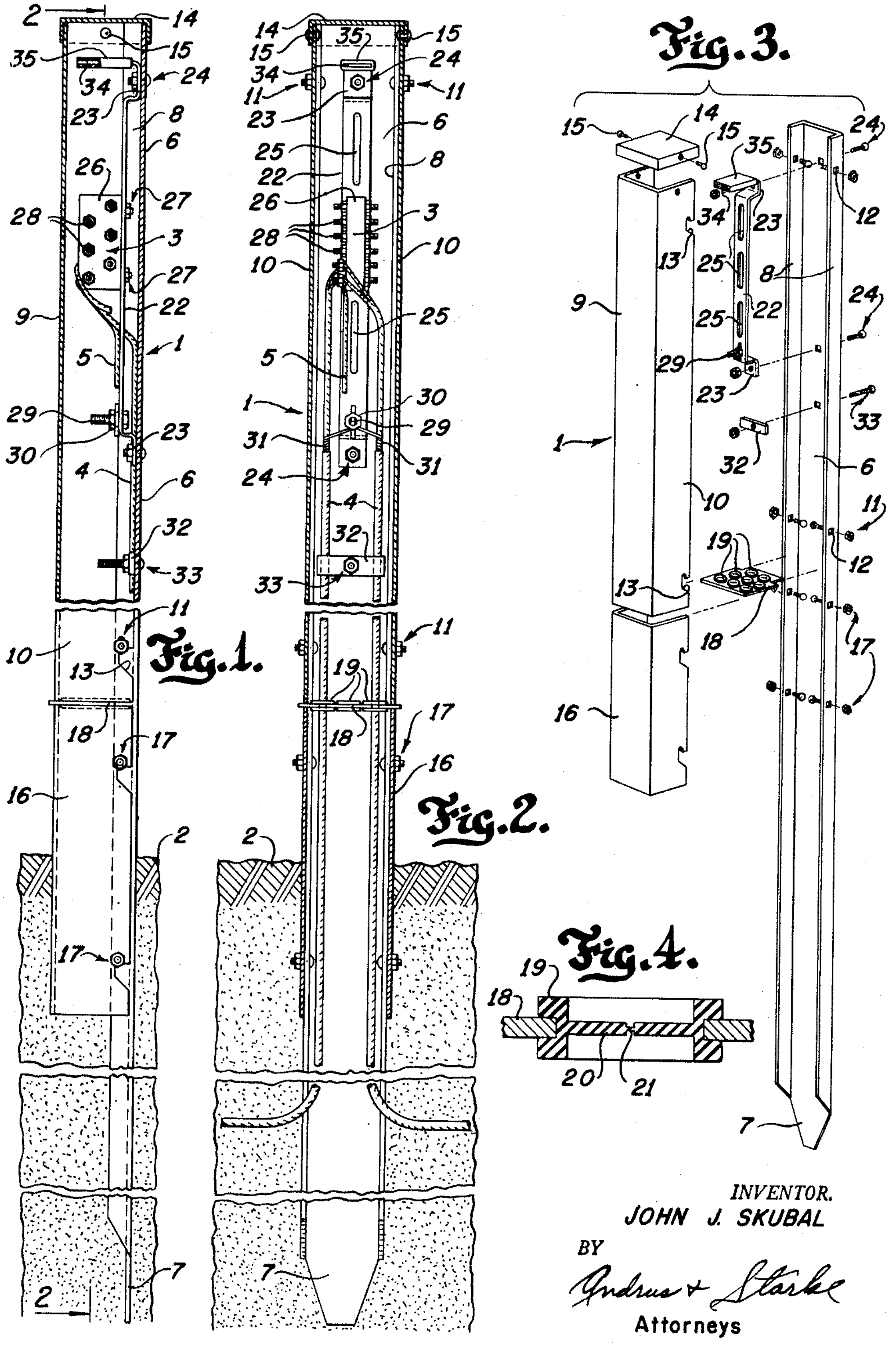
FIG. 1 is a side elevational view with parts broken away of a wire type terminal pedestal.
FIG. 2 is a vertical section taken on line 2—2 of FIG. 1.
FIG. 3 is an exploded perspective view of the wire type pedestal with the terminal block and the conductor pairs removed.
FIG. 4 is an enlarged fragmentary view of a horizontal sealing plate shown in FIGS. 1–3.

Referring to the drawings and particularly to FIGS. 1–3, a wire type terminal pedestal is illustrated for above ground connecting of the conductor pairs and other equipment in an underground telephone system. Generally, the illustrated wire type terminal pedestal includes a pedestal housing 1 having the lower end embedded within the ground 2 immediately adjacent a closed cable trench. A terminal block 3 is attached within the upper end of housing 1. Underground telephone wires 4 which constitute the main lines from the telephone exchange, not shown, are buried within the cable trench and extend upwardly through the pedestal housing 1. The telephone wires 4 are connected to terminals on terminal block 3 in common with a customer's service wires 5 to interconnect preselected wires 4 and 5. The service wires 5 extend downwardly through the pedestal housing 1 and to the customer's telephone, not shown, through the ground.

The housing 1 includes a shallow, channel-shaped stake 6 having a tapered or pointed lower end 7 which is adapted to be driven into the ground to support the terminal block 3 above the ground. The tapered stake 6 is constructed of a sheet metal having sufficient rigidity to allow driving of the stake into the ground. The stake 6 extends vertically upwardly with the terminal block 3 secured to the base portion in the upper end and includes integral side walls 8 which extend forwardly from the base portion adjacent and laterally spaced from the terminal block 3. The rising telephone wires 4 extend upwardly and are nested within the shallow stake 6 for connection to the terminal block 3.

A relatively deep channel-shaped front cover 9 includes side walls 10 which are spaced to telescope over the side walls 8 of stake 6. A close fit is provided between the side walls 8 and 10 to establish a substantially weatherproof and insect proof joint. Side walls 10 are made sufficiently deep to easily accommodate the terminal block and such other components, not shown, as may be mounted on the pedestal.

The illustrated front cover 9 does not carry any components and can be made of a relatively light sheet metal. It is only necessary that it shall have sufficient rigidity to withstand damage due to normal handling and engagement in storage and in the field.

A pair of vertically spaced bayonet type connections 11 detachably secure the front cover 9 to opposite sides of the side walls 8 of the channel-shaped stake 6. Each bayonet connection 11 includes a bolt and nut unit which is loosely secured within appropriately spaced openings 12 in the side walls 8 of stake 6. Correspondingly spaced slots 13 are provided in side walls 10 of the front cover 9. Each slot 13 is generally vertically offset inwardly of the opening to the slot to define very generally L-shaped slots with the leg extending vertically upwardly within the side wall 10. The front cover 9 is slipped over the stake 6 with the slots 13 in engagement with the bolt and nut unit of each bayonet type connection 11. The cover is then dropped downwardly to interlock the front cover 9 to the stake 6 in accordance with the conventional operation of a bayonet type connection, with the upper edges of cover 9 and stake 6 in a common plane. The bolt and nut unit is then drawn up to securely interlock the front cover 9 to stake 6 and define a hollow, square mounting post.

A cup-shaped cap 14 is fitted over the upper ends of the cover 9 and the stake 6 to seal the top end of the unit. Rivets 15 are illustrated fixedly securing the cap 14 to the top of the front cover 9. The rivets 15 extend through the side walls 10 inwardly of the overlap with stake 6 to allow the previous described telescoping of cover 9 to the stake 6. The cap 14 overlies the stake 6 with a front cover 9 slipped onto the stake 6 but not lowered to the final interlock position. As the cover 9 is moved downwardly to establish the interlock of the front cover 9 and stake 6, the cap 14 moves downwardly over the upper end of the stake.

The lower edge of the front cover 9 terminates in spaced relation to the level of ground 2. A ground line cover 16 generally corresponding in cross section to the front cover is secured by a pair of vertically spaced bayonet connectors 17 to the stake 6. The ground line cover 16 extends from the lower end of the cover 9 into the ground to maintain a complete enclosure of the telephone wires for protecting the wires from external foreign elements.

A barrier and grommet plate 18 is clamped between the front cover 9 and the ground line cover 16 to close off the upper end of the housing 1. The plate 18 projects outwardly between the aligned end edges of covers 9 and 16 exteriorly of stake 6 to rigidly clamp and fix the plate 18 in position. As shown most clearly in FIG. 3, the plate 18 includes a projection extending into stake 6 to maintain the upper end of the housing closed.

Referring particularly to FIG. 4, the barrier plate 18 is provided with a plurality of apertures which are sealed by a grommet 19 to accommodate telephone wires 4 and service wires 5. The grommets 19 are generally tubular shaped members formed of a suitable electrically insulating material and have a radial sealing web 20 of a resilient material. Each of the sealing webs 20 includes a thin central line-like portion 21 which is easily ruptured or broken for insertion of the telephone wires 3. The opening formed by rupture of a central portion 21 is less than the diameter of the telephone wires 4. The resilient web 20 stretches as the wires 4 pass through and establishes a positive and firm seal about the telephone wires 4.

The barrier and grommet plate 18 serves to maintain a weather and insect proof enclosure about the terminal block 3 and such other components, not shown, as may be mounted within the upper end of the housing 1.

A rigid metallic mounting and terminal strip 22 is secured longitudinally within the upper end of the housing 1 and is adapted to support the terminal block 3 and such other elements as may be mounted within the housing 1.

The terminal strip 22 incldues L-shaped end legs 23 which extend integrally and laterally from opposite ends of strip 22 substantially in accordance with the depth of the stake side walls 8. The outer ends of portions of the end legs 23 are apertured and aligned with corresponding apertures in the base of the stake 6 centrally of the stake side walls 8. Suitable nut and bolt assemblies 24 pass through the aligned apertures and fixedly secure the strip 22 to the stake 6. The mounting portion of the strip 22 is spaced from the base of the stake 6 by the legs 23 generally in accordance with the depth of the side walls 8.

The mounting portion of terminal strip 22 includes a series of vertically spaced slots 25 which are adapted to accommodate the terminal block 3 and other operating components.

Referring particularly to FIGS. 1 and 2, the terminal block 3 comprises a solid insulating body 26 which is fixedly secured to the terminal strip 22 by a pair of stud and bolt units 27 which extend from one wall of the block 26 and pass through a preselected slot 25. The insulating body is generally rectangular with the principal plane extending vertically and centrally between the side walls 8 of the stake 6. A plurality of binding posts 28 are carried by the body 26 and constitute the connecting means for the telephone wires 4 and service wires 5. The binding posts extend laterally between the side wall 10 of the cover 9 and dispose the connections slightly forwardly of the joint between the front cover 9 and the stake 6. The terminal block is consequently rigidly supported and easily accessible.

A plated split-bolt 29 carrying a cooperating clamping nut 30 is secured to the terminal strip 22 immediately adjacent the lower end leg 23 and constitutes a common ground connection for the incoming telephone wires 4.

The illustrated incoming telephone wires are standard conductors and include an outer encircling metallic cable shield 31 which cover the conductors as shown in FIG. 2. The cable shield 31 generally takes the form of a spiral or coiled metallic ribbon or the like and should be maintained at ground potential. In the illustrated embodiment of the invention, a portion of the outer shield 31 is unwound from the ends of the telephone wires 4 and extended through the plated split bolt 29, as shown in FIG. 2. The clamping nut 30 is threaded onto the split bolt 29 which collapses and firmly interlocks the shield 31 to the split bolt 29.

The metal stake 6 which is driven into the ground creates the ground connection from the cable shield 31 to maintain a grounded shield. Where extraordinary conditions dictate a necessarily extraordinary ground precaution, an additional deep driven ground rod, not shown, may be installed and connected to the steel pedestal. However, for all normal installation the stake 6 will maintain a completely safe and satisfactory ground.

A clamping bar 32 is disposed below the terminal strip 22 and extends transversely across the incoming telephone wires 4 within the stake 6. A nut and bolt assembly 33 extends through aligned openings in bar 32 and the base of stake 6 to releasably secure the clamping bar 32 to the stake 6 with the telephone wires 4 clamped therebetween to positively support the incoming telephone wires 4 and eliminate the load on the binding posts 28.

The retaining clamping bar 32 for the telephone wires 4 holds the wires tucked within the stake portion of the assembly. Consequently, there is no danger of damaging the corresponding wires during the installation and removal of the outer cover means.

The installation and operation of the pedestal illustrated in FIGS. 1–4 is summarized as follows:

The stake 6 is driven into the ground adjacent the trench carrying the telephone wires 4. The terminal strip 22 is secured to the stake 6 and the terminal block 3 is secured to the terminal strip. The service wires 5 and telephone wires 4 are drawn upwardly and passed through preselected grommeted openings in the barrier and grommet plate 18. The resilient web portion 20 presses about the passing wire 4 and seals the opening.

The telephone wires 4 are secured within stake 6 by the clamping bar 32 and connected to the freely exposed binding posts 28 of terminal block 3 without the necessity for threading the wires through a tubular enclosure or the like. The telephone cable shield 31 is stripped from the preselected pairs and interconnected to the split bolt 29 to establish the ground connection.

The ground line cover 16 is secured to the stake 6 with the lower half of the cover buried in the ground 2. The grommet plate 18 is seated on the upper edge of the ground line cover 16 and the front cover 9 is secured to the stake 6 to establish complete enclosure of the terminal block 3.

The terminal block 3 is thus completely enclosed within a weather and insect proof housing 1 and the telephone wires 4 are completely protected from mechanical, fire and similar damage.

The telescoped and close fit between the covers 9 and 16 and the stake 6 forms a practical weather-tight seal which will withstand even extremely severe rain storms and the like.

The removable front cover 9 is rigidly interlocked to the stake 6 to maintain a rugged and reliable protective housing. However, for subsequent maintenance and servicing, the cover 9 is readily removed and the binding posts 28 on the terminal block 3 and such other components as are mounted on terminal strip 22 are readily accessible without further pivotal movement or the like of the terminal block 3, the terminal strip 22 or the like.

The uppermost end of the terminal strip 22 includes a reversely bent extension 34 which is spaced from the upper cap of the pedestal. The extension 34 is covered with an insulating sleeve 35 and is adapted to support a small cable, not shown, in FIGS. 1–3. Thus, there are certain applications where the multi-paired cable containing a plurality of pairs, only certain of which are to be interconnected to the terminal block, must be supported within housing 1. The complete cable is supported over the extension 34 to remove the weight of the cable from the binding posts 28.

Figures 5, 6:
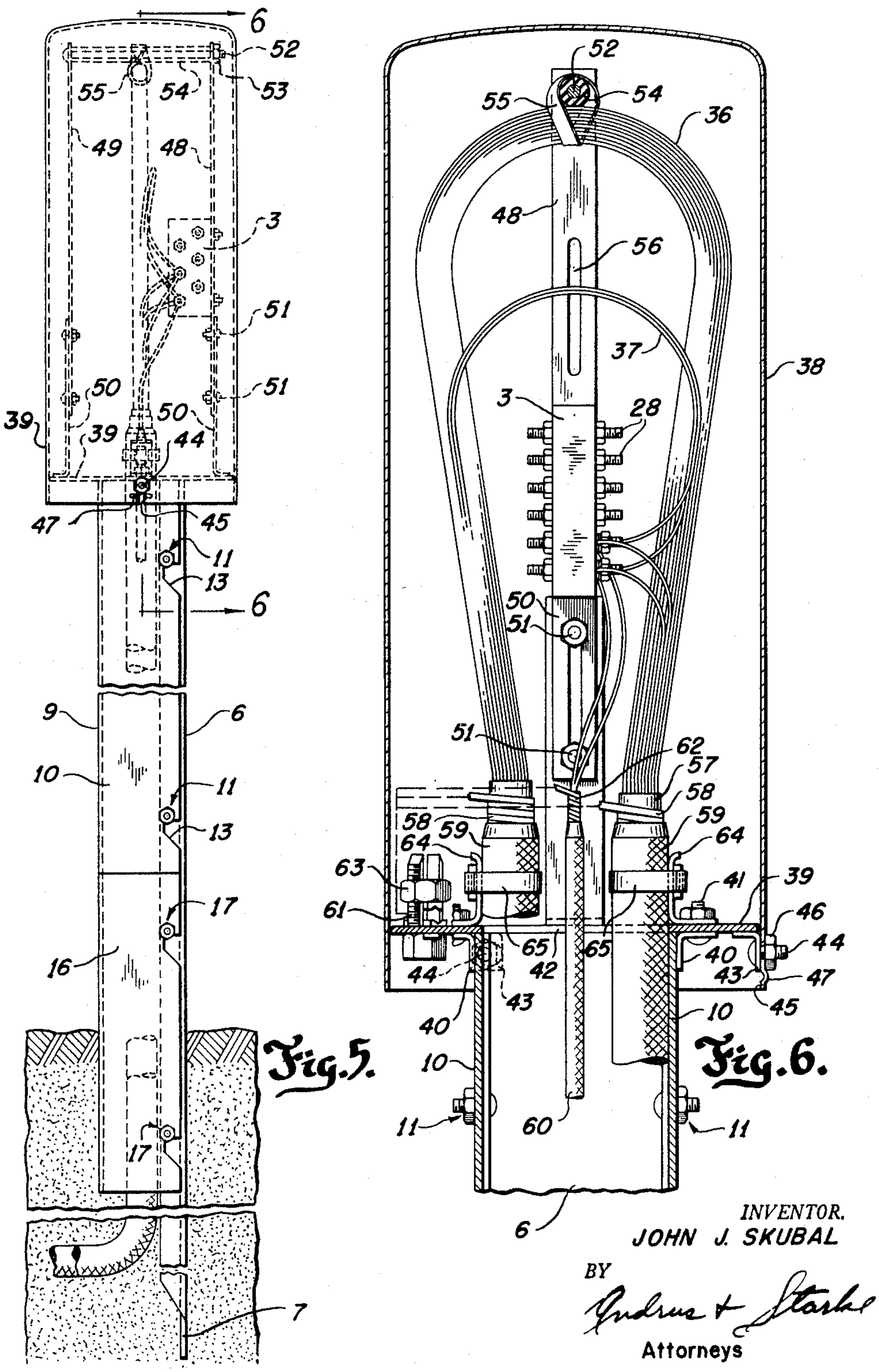
FIG. 5 is a side elevational view similar to FIG. 1 of a cable type pedestal.
FIG. 6 is an enlarged vertical section taken on line 5—5 of FIG. 4 illustrating the upper construction of the cable type pedestal.

Referring particularly to FIGS. 5 and 6, a cable type pedestal adapted to receive a relatively large telephone cable 36 containing a relatively great number of terminative pairs of telephone wires 37, is illustrated and constructed in accordance with another aspect of the present invention.

Corresponding elements in the cable type pedestal are numbered in accordance with the above description for purposes of simplicity and clarity of explanation and understanding of the invention.

The cable type pedestal generally includes the housing 1 of the wire type pedestal with a seam-welded dome 38 substituted for the upper cap 14 and the terminal block 3 mounted within the dome. Thus, the lower portion of the cable type pedestal includes the stake 6 with the front cover 9 and the ground line cover 16 releasably secured in telescoped relation by bayonet type connections 11 and 17. The telehpone cable 36 extends upwardly through the housing 1 and into the seam-welded dome 38 for connection of selected telephone wire pairs 37 to the terminal block 3.

Referring particularly to FIG. 5, the illustrated cable type pedestal installation does not include a barrier corresponding to barrier plate 18 of the wire type pedestal installation illustrated in FIGS. 1–4. Although a barrier would also be desirable in the cable type pedestal, the extreme range of cable sizes which the barrier would have to accommodate requires a barrier which is not particularly adapted to commercial practice. However, the cable type pedestal construction does locate the terminal area at a greater distance above ground level and also provides somewhat better ventilation. Consequently, the moisture problem is less serious than in the wire type pedestal.

The vertical length of slots 13 in the front cover 9 are sufficient to establish engagement of the lower edge of front cover 8 with the upper edge of the ground line cover 16 without the barrier, as shown in FIG. 5.

The seam-welded dome 38 is an inverted deep, cup-shaped member of suitable sheet metal. A mounting plate 39 is secured to the upper end of the pedestal front cover 9 by a pair of L-shaped lugs 40 and the seam-welded dome 38 is releasably mounted on the plate 39, as subsequently described.

Referring particularly to FIG. 6, the L-shaped lugs 40 are spot welded or otherwise rigidly secured to the opposite side walls 10 of the front cover 9 with a laterally extending apertured leg generally aligned with the plane of the upper edge of the front cover 9. The mounting plate 39 is provided with correspondingly aligned apertures and is arranged with the apertures in the mounting plate 39 and the lugs 40 aligned. Suitable nut and bolt assemblies 41 extend through the aligned apertures to support the mounting plate 39 in overlying relation to the upper end of the stake 6 and front cover 9.

The mounting plate 39 includes a central opening 42 which corresponds generally to the opening defined by the front cover 9 and stake 6, and which is aligned to allow insertion of the cable 36 upwardly into the seam-welded dome 38.

The seam-welded dome 38 is supported by the mounting plate 39 overlying the terminal block 3, in the following manner.

Three equicircumferentially spaced angle brackets 43 are welded to the undersurface of mounting plate 39. The outer leg of each bracket 43 depends downwardly in alignment with the outer edge of plate 39 and immediately adjacent the inner surface of the dome 38 which is projected downwardly of plate 39. The depending leg of bracket 43 is apertured to loosely receive a bolt 44 which constitutes a mounting pin for dome 38. A vertical slot 45 is formed in edge of dome 38 adjacent each bracket and mates with the corresponding bolt 44 to support the dome 38. A suitable lock nut 46 threads onto the bolt 44 to securely and rigidly interlock dome 38 in position. Generally, circumferential embossments or ribs 47 are formed on the dome 38 immediately adjacent the lower end of the vertical slots 45. The embossments or ribs 47 create an obstruction to the lock nut 46 when the lock nut 46 is tightened onto the threaded bolt 44. Consequently, in the assembled position the seam-welded dome 38 cannot be removed without first removing or loosening of the lock nut 46.

The terminal block 3 is mounted within dome 38 by one of a pair of mounting and terminal strips 48 and 49 vertically mounted within dome 38.

A pair of laterally spaced brackets 50 are spot welded or otherwise secured to the upper surface of mounting plate 39 on opposite sides of the plate opening 42 and extend vertically upwardly within the dome 38. The terminal strips 48 and 49 are secured one each to the upper end of each of the brackets 50 by a pair of nut and bolt assemblies 51. The terminal strips 48 and 49 extend upwardly toward the closed end of the dome 38 in spaced relation to the side walls of the dome 38 and are joined at the upper ends by a carriage bolt 52 and cooperating nut 53.

A sleeve 54 of fiber or other insulating material encircles the carriage bolt 52 between the strips 48 and 49 to maintain the horizontal spacing therebetween. A cable supporting loop 55 is attached about the fiber sleeve 54 and cable 36 passes through the loop 55.

The terminal strips 48 and 49 include mounting slots 56 to receive and support terminal block 3 on the terminal strip, as shown in the previous embodiment of the invention.

The cable 36 consists of a great plurality of telephone wire pairs 37 which are enclosed within a first inner insulating sheath 57 and a metallic ribbon shield 58 and an outer insulating sheath 59. The metallic ribbon 58 and sheaths 57 and 59 are removed from the portion of cable 36 within the dome 38 and the desired telephone wire pairs 37 are withdrawn from the cable. The balance of the cable 36 is passed through the supporting cable loop 55 to transmit the weight of the cable to the carriage bolt 52. The desired telephone wire pairs 37 which have been removed from the cable 36 are connected to selected binding posts 28 on terminal block 3 for connection to an incoming terminated telephone service wire 60.

The service connection to the customer's telephone is also made underground and the service wire 60 extends downwardly through the pedestal, as shown in FIG. 6.

The base plate 39 may also include releasably sealed openings, not shown, to allow overhead connections which may be dictated by economic considerations. However, such installation is quite unusual and such openings would be provided only for purposes of maximum flexibility.

A split bolt 61 is secured to the mounting plate 39 and the terminated ends of the metallic ribbon 58 and a corresponding ribbon shield 62 of service wire 60 are clamped thereto by a suitable locking nut 62 to establish a common ground connection.

The weight of the telephone wire pairs 37 in cable 36 is removed from the binding posts 28 by a pair of angle supports 64 located immediately adjacent opening 42. The supports 64 are secured to the mounting plate 39 by the same mounting bolt and nut units 41 which secure the mounting plate 39 to the L-shaped lugs 40 on the front cover 9. Standard clamping bands 65 are secured to the cable supports 64 and encircle the sheathed telephone cable 36 to rigidly clamp the adjacent cable to the pedestal.

The angle supports 64 and cooperating bands 65 support the cable 36 extending generally perpendicular to the vertical plane through the terminal strips 48 and 49. Consequently, the cable 36 generally encircles the terminal block 3 and provides a readily accessible and large working area adjacent the terminal block 3.

The function of both the wire type pedestal and the cable type pedestal is to provide above ground terminal facilities for underground telephone lines and differs only in the number of conductor pairs or circuits which can be accommodated.

The installation and operation of the cable type pedestal otherwise corresponds to the previous description of the wire type pedestal except for the previously discussed differences and therefore no further description of the pedestal functioning is given.

Although only free-standing and self-supporting pedestals have been illustrated, the pedestals may also be attached by appropriate brackets to any adjacent available vertical surface for support such as adjacent building walls, poles and the like where desired. Appropriate brackets may be employed to attach the pedestal. The pedestal otherwise is employed and functions in the same manner as the free-standing pedestals. Pole mounted units and the like would normally be used where the underground cable must be run overhead to pass a natural obstruction, such as a river, ravine or solid rock terrain and to connect overhead service drops to customer's telephones.

The removably front cover means and the dome type housing construction for the telephone wire pedestal and the cable pedestal respectively, both establish large and unobstructed working areas for connecting and servicing of the telephone system connections. The invention thus facilitates not only the installation of the assembly, but subsequent testing, repairing and maintenance which is necessarily required in any telephone system.

The detachable cover means releasably secured to the mounting stake eliminates threading of the telephone cable or wires upwardly through any portion of the assembly and greatly simplifies the arrangement and placement of the cable and the telephone wires. The telescoped cover construction provides maximum rigidity and excellent weather and insect protection.

The pedestals can be fabricated having a uniform and pleasing appearance and are thus particularly suited for residential and similar areas where aesthetic characteristics must be given much consideration.

The present invention provides telephone wire and telephone cable pedestals which are rugged and dependable in both mechanical and electrical performance. Although the present invention is particularly illustrated in connection with telephone wiring systems, the invention as set forth in the following claims not otherwise specifically limited are applicable to any other buried wiring system where it is necessary to bring at least some of the conductors out of the ground for connection to other elements or to each other. The pedestals are readily and easily installed adjacent connecting points in the outside plant of a telephone system. The pedestal of the present invention provides excellent protection against the weather and insects and allows immediate and quick access to the telephone wires and the like.

Various modes of carrying out the invention are contemplated as being within the scope of the following claims particularly pointing out and distinctly claiming the subject matter which is regarded as the invention.

I claim:

1. In a terminal pedestal for connecting conductors and accessories in an underground wiring system, a tubular housing for enclosing the conductors and having a stake and embedded in the ground and projecting upwardly therefrom, said housing having an upper wall means releasably secured to the stake and a lower wall means releasably secured to the stake and extending downwardly into the ground, an intermediate transverse wall clamped between the upper and lower wall means and spanning the housing to prevent entrance of foreign matter upwardly into the housing, said wall having openings to pass said conductors, and grommets closing said openings and having a rupturable resilient web to allow for forming openings in the grommet for passage of the conductors, said resilient web engaging the adjacent conductors to maintain the opening closed about the conductor.

2. A terminal pedestal for connecting telephone conductors in an underground wiring system, a shallow channel-shaped stake driven into the ground in use, a deep channel-shaped upper cover closely telescoped with the side walls of the shallow channel-shaped stake, a ground-line cover having an upper end corresponding in cross-section to said upper cover and closely telescoped with the side walls of the stake, said ground-line cover extending from the lower edge of the upper cover into the ground to encircle the telephone conductors and defining a vertical passageway, a wall clamped between the adjacent edges of the upper cover and the ground-line cover to seal the adjacent junction and to substantially close the vertical passageway defined by said stake and covers, said wall having a series of distributed openings to allow passage of said conductors, grommets secured within said openings and having a resilient web closing the openings, said web having a readily broken generally central portion to allow opening of the web for passage of a conductor, and means to close the upper end of the stake and upper cover.

3. In a free-standing terminal pedestal for supporting a terminal block upon a terminal strip for connecting telephone wires and accessories in an underground telephone system, a shallow channel-shaped stake of a rigid metal having one end driven into the ground in use, a terminal strip having offset legs secured to the upper end of the stake to dispose the terminal block supporting surface generally aligned with the outer edges of the stake to dispose the terminal block outwardly of the stake, a deep channel-shaped front cover telescoped over the stake co-extensively of the terminal strip and releasably secured to the stake, a ground-line cover corresponding in cross-section to the front cover and telescoped over the stake from the lower end of the front cover into the earth adjacent the buried end of the stake, a barrier plate having a series of telephone wire openings to accommodate said telephone wires and having an edge portion clamped between the front cover and the ground-line cover to establish a continuous wall sealing the housing defined by the front cover from the earth, and a cap secured to the front cover and adapted to extend over the upper end of the stake to weather-and-insect proof the upper end of the pedestal.

4. In a free-standing terminal pedestal for supporting a terminal block upon a terminal strip for connecting telephone wires and accessories in an underground telephone system, a shallow channel-shaped stake of a rigid metal having one end driven into the ground in use, a terminal strip having offset legs secured to the upper end of the stake to dispose the terminal block supporting surface generally aligned with the outer edges of the stake to dispose the terminal block outwardly of the stake, a deep channel-shaped front cover adapted to be telescoped over the stake co-extensively of the terminal strip and releasably secured to the stake, a ground-line cover corresponding in cross-section to the front cover and telescoped over the stake from the lower end of the front cover into the earth adjacent the buried end of the stake, separable bayonet coupling secured to the telescoped portions of the stake and the front cover and the ground-line cover and arranged to have the front and ground-line covers telescoped onto the stake and then lowered to interlock the front and the ground-line covers to the stake, a barrier plate having a series of telephone wire openings to accommodate said telephone wires and having an edge portion clamped between the front cover and the ground-line cover to establish a continuous sealing wall, and a cap secured to the upper end of the front cover and adapted to move over and downwardly upon the stake incident to assembly of the front cover and the stake.

5. In a free-standing terminal pedestal adapted to support a terminal block for connecting telephone wires and accessories in an underground telephone system, a shallow rectangular channel-shaped stake of a rigid metal and having one end driven into the ground in use, a metallic terminal strip having end legs secured to the central upper end of the stake with a slotted terminal block supporting surface generally aligned with the outer edges of the stake to arrange the terminal block outwardly of the stake, an insulated cable support extension secured to the upper end of the terminal strip, a clamping bar below said terminal strip and adapted to clamp the telephone wires below the terminal strip to the central portion of the stake, a deep rectangular channel-shaped front cover adapted to be telescoped over the stake at least co-extensively of the terminal strip and releasably secured to the stake, a ground-line cover corresponding in cross-section to the front cover and telescoped over the stake from the lower end of the front cover into the earth adjacent the buried end of the stake, a barrier plate having a series of telephone wire openings to accommodate said telephone wires mounted below said clamping bar to establish a continuous wall sealing the housing defined by the front cover from the earth, and top closure means overlying the upper end of the stake and front cover to weather-and-insect proof the upper end of the pedestal.

6. In a free-standing terminal pedestal for supporting a terminal block and for connecting telephone wires having a ground shield and accessories in an underground telephone system, a shallow channel-shaped stake of a rigid metal and having one end driven into the ground in use, a metallic terminal strip means to secure the terminal strip to the upper end of the stake with a terminal attaching surface generally aligned with the outer edges of the stake to dispose the terminal block outwardly of the stake, a ground attachment secured to said metallic terminal strip and adapted to receive an extension of the ground shield for said telephone wires, a clamping bar below said terminal strip for clamping the telephone wires within the stake and to remove the load from the terminals of the terminal block, a deep channel-shaped front cover telescoped over the stake at least co-extensively of the terminal strip, bayonet coupling means secured to the stake and to the front cover, a ground-line cover corresponding in cross-section to the front cover and telescoped over the stake from the lower end of the front cover downwardly into the earth adjacent the buried end of the stake, bayonet coupling means secured to the stake and ground-line cover, a barrier plate having a series of telephone wire openings to accommodate said telephone wires and having an edge portion clamped between the front cover and the ground-line cover to establish a continuous wall sealing the housing defined by the front cover from the earth, and a cap secured to the front cover and adapted to extend over the upper end of the stake to weather-and-insect proof the upper end of the pedestal.

7. In a free-standing terminal pedestal for supporting a telephone cable and a terminal block having connecting means for connecting telephone wires and accessories in an underground telephone system, a tubular housing formed of a pair of channel-shaped members and having one end embedded in the ground with the cable passing upwardly therethrough in use, a mounting plate attached to the upper end of the housing and having an opening aligned with the tubular housing, a pair of vertically arranged mounting strips secured to the mounting on opposite sides of the opening, a rigid rod-like means joining the upper ends of the mounting strips, an electrically insulating sleeve encircling said rod-like means intermediate said strips to maintain preselected spacing of the strips, a cable loop secured to the insulating sleeve to support the telephone cable, said terminal block being secured to one of said mounting strips with the connecting means disposed between the mounting strips, cable clamps secured to the mounting plate rotated ninety degrees from said mounting strips and adapted to be secured to the telephone cable to support the weight of the cable and to arrange the cable encircling the terminal block, and a cup-shaped dome releasably mounted over the terminal strip and mounting plate to establish a weather-and-insect proof housing.

8. In a free-standing terminal pedestal for supporting a telephone cable and a terminal block having connecting means for connecting telephone wires and accessories in an underground telephone system, a tubular housing formed of a pair of channel-shaped members and having one end embedded in the ground with the cable passing upwardly therethrough in use, a mounting plate attached to the upper end of the housing and having an opening aligned with the tubular housing, a pair of vertical brackets secured to the outer portion of the mounting plate on opposite sides of the opening, terminal strips releasably secured to the brackets and adapted to support the terminal block between the strips, a rigid rod-like member tieing the upper ends of the terminal strips together, an insulating sleeve encircling the rod-like member between said strips and maintaining vertical alignment of the strips, a cable support secured to the sleeve centrally of the strips to support the cable in a vertical plane centrally of terminal strips, cable clamps secured to the mounting plate in a common plane with the cable support and adapted to grasp the cable to support the cable with a loop extending outwardly of the terminal block, an inverted cup-shaped dome telescoped over the mounting plate, and means to releasably secure the dome to the mounting plate.

9. In a free-standing terminal pedestal for supporting a telephone cable and a terminal block for connecting telephone wires and accessories in an underground telephone system, a channel-shaped stake of a rigid metal and having one end driven into the ground in use, lower and upper channel-shaped covers telescoped over the stake and releasably secured to the stake to form a tubular housing for said cable, the lower cover extending into the ground, a mounting plate releasably fixed to the upper end of the upper cover and being apertured in accordance with the tubular housing, a pair of mounting strips secured to the mounting plate and extending vertically upwardly therefrom, means joining the upper ends of the mounting strips and including an electrically insulating portion intermediate said strips, a cable loop secured to the insulating portion to support the telephone cable, said terminal block being secured to at least one of said mounting strips and having binding posts to receive telephone wires from said cable, cable clamps secured to the mounting plate and adapted to be secured to the telephone cable to support the weight of the cable, a ground connection adapted to be connected to the cable shield to maintain the shield at ground potential, an inverted cup-shaped member adapted to extend downwardly over the mounting plate, and releasable means securing said inverted cup-shaped member to the mounting plate.

References Cited in the file of this patent

UNITED STATES PATENTS

| | | |
|---|---|---|
| 256,866 | Teal | Apr. 25, 1882 |
| 1,094,990 | Havens | Apr. 28, 1914 |
| 1,445,072 | Cook | Feb. 13, 1923 |
| 1,620,047 | Van Valkenburg | Mar. 8, 1927 |
| 2,132,400 | Curren | Oct. 11, 1938 |
| 2,161,492 | Wadsworth | June 6, 1939 |
| 2,317,450 | Folds et al. | Apr. 27, 1943 |
| 2,779,496 | Henderson | Jan. 29, 1957 |
| 2,812,654 | Hoseason | Nov. 12, 1957 |
| 2,820,088 | Sperry | Jan. 14, 1958 |
| 2,916,539 | Hamilton | Dec. 8, 1959 |

OTHER REFERENCES

Publication: The Utility Buried Cable Terminals by Utility Products Company, 3111 W. Mill Road, Milwaukee 9, Wisconsin.